(12) United States Patent
Ji et al.

(10) Patent No.: US 12,019,658 B2
(45) Date of Patent: Jun. 25, 2024

(54) APPARATUS AND METHOD FOR GENERATING POSITIONING DATABASE

(71) Applicant: ELECTRONICS AND TELECOMMUNICATIONS RESEARCH INSTITUTE, Daejeon (KR)

(72) Inventors: Myungin Ji, Daejeon (KR); Youngsu Cho, Daejeon (KR); Ju Il Jeon, Daejeon (KR); Seonghun Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 668 days.

(21) Appl. No.: 17/174,582

(22) Filed: Feb. 12, 2021

(65) Prior Publication Data

US 2021/0294824 A1 Sep. 23, 2021

(30) Foreign Application Priority Data

Mar. 19, 2020 (KR) .................. 10-2020-0033630

(51) Int. Cl.
*G06F 16/29* (2019.01)
*G01S 11/06* (2006.01)
(Continued)

(52) U.S. Cl.
CPC ............. *G06F 16/29* (2019.01); *G01S 11/06* (2013.01); *H04B 17/318* (2015.01); *H04W 64/006* (2013.01)

(58) Field of Classification Search
CPC ....... G06F 16/29; H04B 17/318; G01S 11/06; H04W 64/006
See application file for complete search history.

(56) References Cited

U.S. PATENT DOCUMENTS 8,958,980 B2 * 2/2015 Miksa ..................... G06F 16/29
348/42
9,078,231 B2 7/2015 Cho et al.
(Continued)

FOREIGN PATENT DOCUMENTS

KR 10-2011-0011546 2/2011
KR 10-2014-0102450 8/2014
(Continued)

*Primary Examiner* — Elias Desta
(74) *Attorney, Agent, or Firm* — KILE PARK REED & HOUTTEMAN PLLC

(57) ABSTRACT

A computing device loads signal strengths of wireless communication signals collected at a plurality of first collection areas and position information of the first collection areas, sets positions of a plurality of virtual transmitting apparatuses. The computing device estimates signal strengths of wireless communication signals in a plurality of second collection areas based on a distance between a position of each of the virtual transmitting apparatuses and each of the first collection areas, a signal strength collected at each of the first collection areas, and a distance between a position of each of the virtual transmitting apparatuses and each of the second collection areas. The computing device determines an optimal virtual transmitting apparatus among the virtual transmitting apparatuses, and generates positioning data at the second collection areas based on signal strengths in the second collection areas which are estimated based on a position of the optimal virtual transmitting apparatus.

19 Claims, 12 Drawing Sheets

(51) Int. Cl.
*H04B 17/318* (2015.01)
*H04W 64/00* (2009.01)

(56) References Cited

U.S. PATENT DOCUMENTS

| | | | |
|---|---|---|---|
| 9,232,494 B1 | 1/2016 | Shin et al. | |
| 9,743,254 B2 * | 8/2017 | Friday | H04B 17/318 |
| 9,774,690 B2 * | 9/2017 | Sano | H04L 67/52 |
| 10,349,372 B2 | 7/2019 | Lee et al. | |
| 2014/0228058 A1 | 8/2014 | Ji et al. | |
| 2016/0337804 A1 | 11/2016 | Kim et al. | |

FOREIGN PATENT DOCUMENTS

| | | |
|---|---|---|
| KR | 10-1597690 | 2/2016 |
| KR | 10-2016-0133716 | 11/2016 |
| KR | 10-2019-0053470 | 5/2019 |
| KR | 10-2019-0128371 | 11/2019 |

\* cited by examiner

APPARATUS AND METHOD FOR GENERATING POSITIONING DATABASE

CROSS-REFERENCE TO RELATED APPLICATION

This application claims priority to and the benefit of Korean Patent Application No. 10-2020-0033630 filed in the Korean Intellectual Property Office on Mar. 19, 2020, the entire contents of which are incorporated herein by reference.

BACKGROUND

(a) Field

The described technology generally relates to an apparatus and a method for generating a positioning database.

(b) Description of the Related Art

Position estimation technologies using wireless communication infrastructures are classified into various types depending on an infrastructure type and a service range. A global navigation satellite system (GNSS) refers to a system that determines a user's position using satellite signals on orbit of the Earth. The USA's global positioning system (GPS), Russia's global navigation satellite system (GLONASS) and Europe's Galileo are currently operated or are scheduled to be operated. The GNSS provides high position accuracy within 10 m and availability in suburban areas or flat areas where direct line of sight between the satellite and the receivers is secured. However, in the urban areas of non-line of sight, a position error reaches 50 m due to multipath errors. Specifically, the reception sensitivity is deteriorated in indoor areas, so signal acquisition is not possible, making it difficult to determine the position.

Among the wireless communication infrastructures, a cellular-based position estimation technology determines the user's position using position information and signal information of a mobile communication base station. Specifically, the cellular-based position estimation technology uses methods such as Cell-ID and E-OTD (enhanced-observed time difference) depending on the number of base stations that can be received from a terminal. It is possible to determine the position not only outdoors but also indoors, due to the characteristic of mobile communication infrastructure covering most of the urban and suburban areas as service ranges. However, it has been alienated from services requiring accuracy of several to tens of meters, due to the low position estimation accuracy.

In the indoors, a position estimation technology mainly using Wi-Fi has been suggested. After a database is constructed by collecting a received signal strength indicator (RSSI) for each reference point, for each Wi-Fi access point in a service area, the terminal searches the database for a pattern most similar to the signal strength received in the service area and regards the corresponding reference point as a current position. The Wi-Fi-based position estimation technology has a relatively high accuracy, so it can be applied to indoor navigation services. However, since the Wi-Fi-based location estimation technology takes a lot of time and money to collect the Wi-Fi signals, there is a limit to construct it in all buildings.

Regardless of whether the global navigation satellite system is available or not, the received signal strengths of wireless communication resources should be stored for all areas where the terminals can exist in order to calculate correct positions of the terminals using only the wireless communication signals. However, it is difficult to generalize this method because collection is limited in some areas.

SUMMARY

Some embodiments provide an apparatus and a method for generating a positioning database capable of generating positioning data of other areas from collection data collected at some areas.

According to some embodiments, an apparatus for generating a positioning database is provided. The apparatus includes a memory for storing one or more instructions, a storage device and a processor. The storage device stores signal strengths of wireless communication signals collected at a plurality of first collection areas among a plurality of collection areas and position information of the first collection areas, the collection areas including the first collection areas and a plurality of second collection areas; and The processor, by executing the one or more instructions, sets positions of a plurality of virtual transmitting apparatuses, generates a signal strength estimation model in each of the virtual transmitting apparatuses based on a distance between a position of a corresponding virtual transmitting apparatus and each of the first collection areas and a signal strength collected at each of the first collection areas, estimates signal strengths of wireless communication signals in the collection areas based on a distance between the position of each of the virtual transmitting apparatuses and each of the collection areas and the signal strength estimation model in each of the virtual transmitting apparatuses, and generates a positioning database based on signal strengths that are estimated at a position of a virtual transmitting apparatus corresponding to the signal strength estimation model with a highest accuracy of the estimated signal strengths among the virtual transmitting apparatuses.

In some embodiments, each of the first collection areas may include at least one collection point, and the signal strength collected at each of the first collection areas may be a statistical value of a signal strength collected at the at least one collection point.

In some embodiments, the statistical value of the signal strength collected at the at least one collection point may include an average value of the signal strength collected at the at least one collection point.

In some embodiments, the signal strength estimation model may include a path loss model of a signal strength to a distance from the corresponding virtual transmitting apparatus.

In some embodiments, the processor may generate the path loss model by performing multinomial regression based on the distance between the position of the corresponding virtual transmitting apparatus and each of the first collection areas and the signal strength collected at each of the first collection areas.

In some embodiments, the processor may determine the signal strength estimation model with a smallest error between the estimated signal strengths and the signal strengths collected at the first collection areas as the signal strength estimation model with the highest accuracy.

In some embodiments, the processor may generate the positioning database based on the signal strengths that are estimated at the position of the virtual transmitting apparatus corresponding to the signal strength estimation model with the highest accuracy, and position information of collection areas corresponding to the signal strengths.

In some embodiments, the wireless communication signals collected at the first collection areas may belong to wireless communication signals transmitted from a specific transmitting apparatus.

In some embodiments, the wireless communication signals collected at the first collection areas may belong to a specific band or channel among the wireless communication signals transmitted from the specific transmitting apparatus.

In some embodiments, the processor may repeat an operation of generating the positioning database in the specific transmitting apparatus and the specific band or channel over a plurality of transmitting apparatuses and a plurality of bands or channels in each of the transmitting apparatuses.

According to some embodiments, a method of generating a positioning database by a computing device is provided. The computing device loads signal strengths of wireless communication signals collected at a plurality of first collection areas and position information of the first collection areas, sets positions of a plurality of virtual transmitting apparatuses, estimates signal strengths of wireless communication signals in a plurality of second collection areas based on a distance between a position of each of the virtual transmitting apparatuses and each of the first collection areas, a signal strength collected at each of the first collection areas, and a distance between a position of each of the virtual transmitting apparatuses and each of the second collection areas, determines an optimal virtual transmitting apparatus among the virtual transmitting apparatuses, and generates positioning data at the second collection areas based on signal strengths in the second collection areas which are estimated based on a position of the optimal virtual transmitting apparatus.

According to some embodiments, a method of generating a positioning database by a computing device is provided. The computing device loads signal strengths of wireless communication signals collected at a plurality of first collection areas and position information of the first collection areas, sets a position of a virtual transmitting apparatus, generates a signal strength estimation model in the virtual transmitting apparatus based on a distance between the position of the virtual transmitting apparatus and each of the first collection areas and a signal strength collected at each of the first collection areas, estimates signal strengths of wireless communication signals in a plurality of second collection areas based on a distance between the position of the virtual transmitting apparatus and each of the second collection areas and the signal strength estimation model, and generates positioning data based on signal strengths estimated at the position of the virtual transmitting apparatus.

According to some embodiments, it is possible to generate a positioning database for the whole area through an estimation process based on partial collection data, thereby increasing the efficiency of data collection and generating the positioning database even in an area where collection is difficult.

DETAILED DESCRIPTION OF THE EMBODIMENTS

Figure 1:
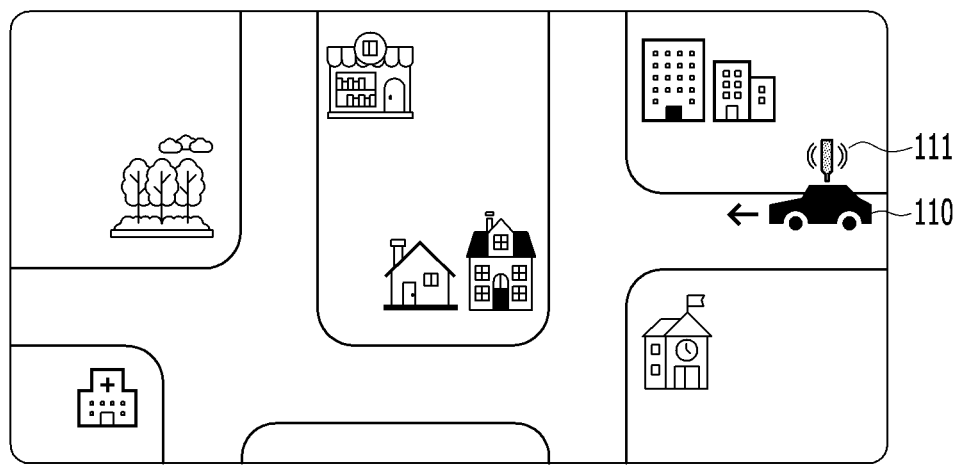
FIG. 1 and FIG. 2 are drawings for explaining collection of positioning data for a positioning database generating apparatus according to embodiments.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
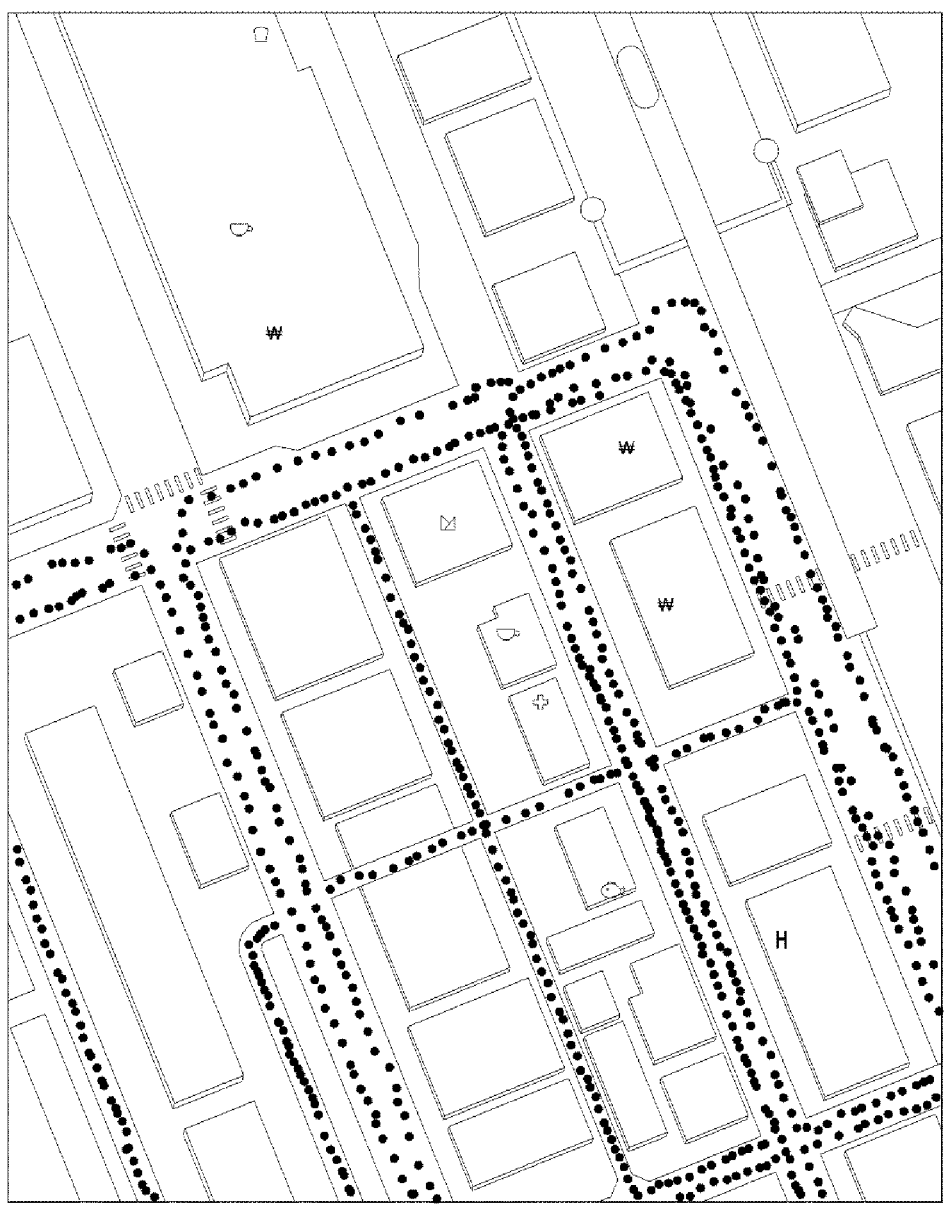

FIG. 1 and FIG. 2 are drawings for explaining collection of positioning data for a positioning database generating apparatus according to embodiments.

As shown in FIG. 1, a collection device 110 receives a wireless communication signal periodically or from time to time while moving, and stores information of the received wireless communication signal by combining it with position information of a collection point where the wireless communication signal is collected.

In some embodiments, the collection device 110 may include a scan device 111 capable of collecting wireless communication signals. The scan device 111 may be a device capable of collecting wireless communication signals, for example, such as wireless wideband signals such as long term evolution (LTE) signals or fifth generation (5G) signals; wireless local area network (LAN) signals such as Wi-Fi signals; or personal area network (PAN) signals such as Bluetooth low energy (BLE) signals. In addition, the collection device 110 may include a positioning device, for example a global positioning system (GPS) device, capable of measuring a collection position at a point where a wireless communication signal is received. In some embodiments, the collection device 110 may be, for example, means of transportation such as a vehicle. In some embodiments, the collection device 110 may be, for example, an unmanned aerial vehicle (UAV) or an unmanned robot. In some embodiments, a person may carry the collection device 110 and collect positioning data through walking or bicycle. The present invention is not limited to the collection device 110, and positioning data collected through various methods can be used.

For example, collection points may be obtained by the moving collection device 110 as shown in FIG. 2. Accordingly, the collection device 110 may collect information of a wireless communication signal and position information at each collection point.

The positioning database generating apparatus receives, from the collecting device 110, positioning data corresponding to the information of the wireless communication signal collected by the collecting device 110 and the collection position. In some embodiments, the positioning database generating apparatus may receive the positioning data from the collection device 110 through, for example, wireless communication or wire communication. In some embodiments, the positioning database generating apparatus may receive the positioning data from the collection device 110 through a physical storage medium. In some embodiments, the positioning database generating apparatus may include the collection device 110.

The positioning database generating apparatus may generate positioning data of an area that is not collected by the collecting device 110 based on the positioning data received from a plurality of collecting devices 110.

Next, a positioning database generating method according to embodiments is described with reference to FIG. 3 to FIG. 6F.

Figure 3:
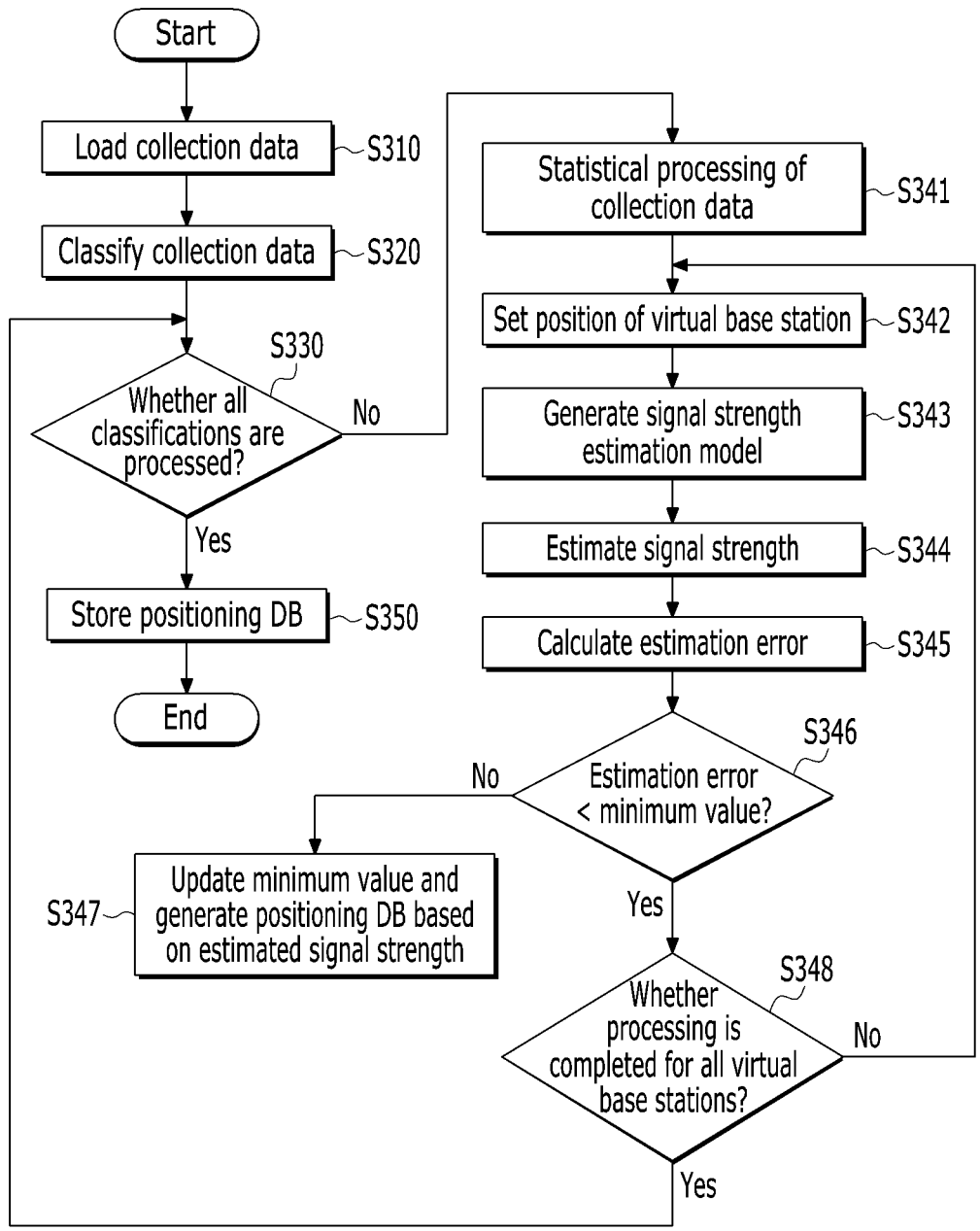
FIG. 3 is a flowchart showing an example of a positioning database generating method according to embodiments.
Figure 4:
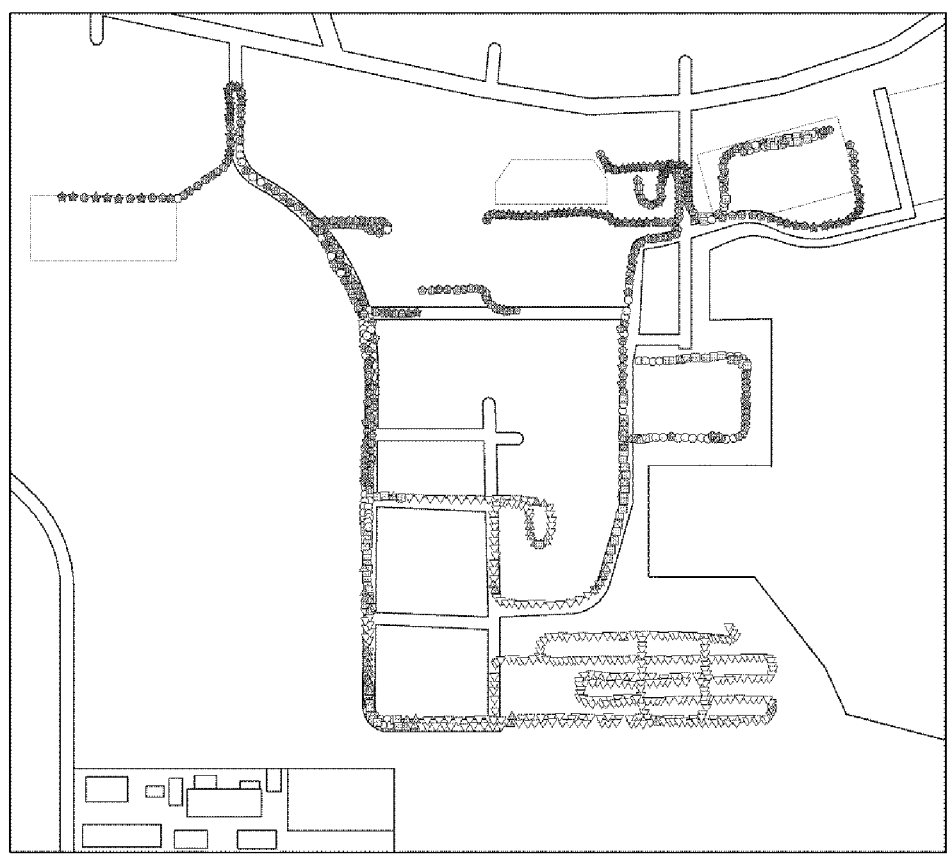
FIG. 4 is a drawing showing an example of collection data used in a positioning database generating method according to embodiments.
Figure 5:
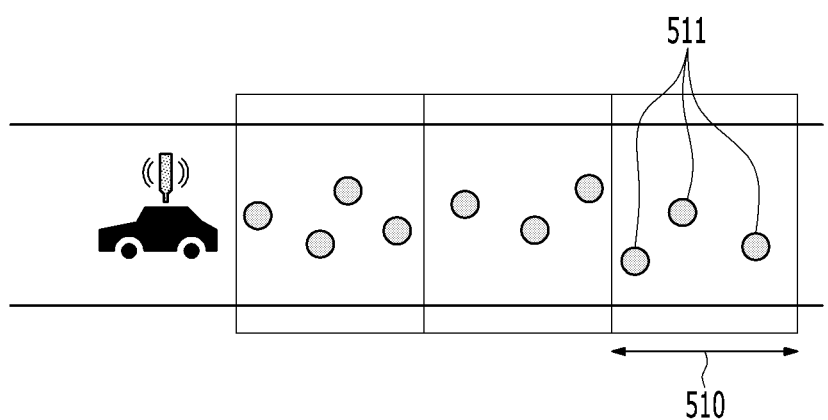
FIG. 5 is a drawing showing an example of a collection area used in a positioning database generating method according to embodiments.

FIG. 3 is a flowchart showing an example of a positioning database generating method according to embodiments, and FIG. 4 is a drawing showing an example of collection data used in a positioning database generating method according to embodiments. FIG. 5 is a drawing showing an example of a collection area used in a positioning database generating method according to embodiments. FIG. 6A, FIG. 6B, FIG. 6C, FIG. 6D, FIG. 6E and FIG. 6F are drawings showing examples of positions of virtual base stations and estimated signal strengths in a positioning database generating method according to embodiments.

Referring to FIG. 3, a positioning database generating apparatus loads collected positioning data (hereinafter referred to as "collection data") at step S310. In some embodiments, the collection data may include position information (e.g., latitude and longitude coordinates) of a collection point and information of a wireless communication signal acquired at the collection point.

In some embodiments, the information of the wireless communication signal may include an identifier of a transmitting apparatus that transmits the wireless communication signal and strength information of the wireless communication signal. For example, when the wireless communication signal is a wireless wideband (e.g., LTE) signal, the information of the wireless communication signal may include an identifier of the base station (e.g., physical cell identity (PCI) and strength information of the received signal (e.g., reference signal received power (RSRP)), and may further include band or channel information of the received signal. When the wireless communication signal is a wireless LAN (e.g., Wi-Fi) signal, the information of the wireless communication signal may include an identifier (e.g., media access control (MAC) address) of an access point (AP) and strength information of the received signal (e.g., received signal strength indicator (RSSI)). When the wireless communication signal is a PAN (e.g., BLE) signal, the information of the wireless communication signal may include an identifier (e.g., MAC address) of a beacon and strength information of the received signal (e.g., RSSI).

The positioning database generating apparatus classifies the collection data at step S320. In some embodiments, the positioning database generating apparatus may classify the collection data according to identifiers of transmitting apparatuses. For example, the positioning database generating apparatus may classify the collection data according to identifiers of base station in a case of LTE signals, identifiers (e.g., MAC addresses) of APs in a case of Wi-Fi signals, or identifiers (e.g., MAC addresses) of beacons in a case of BLE signals. In some embodiments, the positioning database generating apparatus may further classify the collection data according to channels (or bands) in the case of LTE signals. For example, the collection data belonging to a specific channel of a specific base station may be displayed as shown in FIG. 4. In FIG. 4, different signal strengths are shown with symbols of different shapes.

Next, the positioning database generating apparatus may generate a positioning database by processing the collection data for each classification (see steps S341 to S348), and may repeated this operation until processing the collection data of all classifications at step S330. In some embodiments, the positioning database generating apparatus may perform an operation of processing the collection data for each classification in parallel for a plurality of classifications. Hereinafter, for convenience, it is assumed that the wireless communication signal is an LTE signal.

First, the positioning database generating apparatus generates statistical values by performing statistical processing of the collection data at step S341. In some embodiments, the positioning database generating apparatus may perform the statistical processing of collection data acquired in the same collection area. In some embodiment, as shown in FIG. 5, a positioning target area may be divided into collection areas with a predetermined size (e.g., lattices with a predetermined size). Then, position information of a collection area in which collection data is not collected may be calculated based on position information of a collection area in which collection data is collected. In some embodiments, when a plurality of collection data 511 are present in the same collection area 510, the positioning database generation apparatus may calculate a representative value (e.g., an average value) of signal strengths of the plurality of collection data 511 in the same collection area 510. In some embodiments, the positioning database generating apparatus may further calculate distribution or standard deviation of the signal strengths of the plurality of collection data 511 in the same collection area 510, in addition to the average value. In some embodiments, the statistical value of the collection data 511 may be used to determine an accuracy of a signal strength estimated in the collection area 510.

The positioning database generating apparatus arbitrarily sets a position of a virtual base station at step S342. In some embodiments, the position of the virtual base station may be a position in which a base station is likely to exist, including collection points.

Next, the positioning database generating apparatus generates a signal strength estimation model based on the positions of the virtual base stations and the statistical values of the collection data at step S343. In some embodiments, the positioning database generating apparatus may generate the signal strength estimation model based on a distance d between the position of the virtual base station and the collection point and the statistical value at the collection point. In some embodiment, the signal strength estimation model may include a path loss model. In some embodiment, the positioning database generating apparatus may generate a path loss model of a signal strength to a distance from a base station, for example, shown in Equation 1, by converting the collection data into information ($d$, $\overline{RSRP}$) consisting of a pair of the distance $d$ between the position of the virtual base station and the collection point and the statistical value $\overline{RSRP}$ of the collection data at the collection point, and performing multinomial regression based on based on the converted information ($d$, $\overline{RSRP}$) for a plurality of collection data. The path loss model may be given as an n-order polynomial (n is a natural number).

$$\overline{RSRP} = ad^n + bd^{n-1} + \ldots + c \qquad \text{Equation 1}$$

In Equation 1, $\overline{RSRP}$ denotes the estimated signal strength, d is the distance between the position of the virtual base station and the collection point, and a, b and c are parameters determined by polynomial regression.

The positioning database generation device estimates a signal strength for each collection area (for example, each predetermined lattice) for a plurality of points at which where radio waves can arrive from the position of the virtual base station based on the generated signal strength estimation model at step S344. In some embodiments, the positioning database generating apparatus may estimate the signal strength by inputting a distance d from each point to the virtual base station to Equation 1. In some embodiments, each point may be a predetermined point (e.g., a central point) in the collection area. In some embodiments, the positioning database generating apparatus may estimate the signal strengths for both a point at which the collection data is collected and a point at which the collection data is not collected.

Next, the positioning database generating apparatus determines the accuracy of the signal strength estimation model based on the information of the point where the collection data is collected and the estimated signal strength at steps S345 and S346. The positioning database generating apparatus calculates a difference between the statistical value $\overline{RSRP}$ and the estimated signal strength $\widetilde{RSRP}$ at the point where the collection data is collected, and calculates an estimation error based on the differences at a plurality of points at which the collection data are collected at step S345. In some embodiments, at step S345, the positioning database generating apparatus may calculate the estimation error as an accumulated value of differences at the plurality of points as in Equation 2.

$$EstimationError = \sum_{1}^{N} |\overline{RSRP} - \widetilde{RSRP}|$$ Equation 2

Here, N denotes the number of collection data.

As such, when determining the accuracy of the signal strength estimated based on the statistical value at the point where the collection data is collected, the statistical value of the collection data may be similar to the estimated signal strength if the signal strength estimation model is similar to an actual model. Therefore, the smaller the estimation error is, the more accurate the signal strength estimation model is. Accordingly, the positioning database generating apparatus determines whether the estimation error of the signal strength estimation model estimated based on the position of the virtual base station set this time is a minimum value at step S346. That is, at step S346, the positioning database generator compares the estimation error of the signal strength estimation model estimated based on the position of the virtual base station set this time with a minimum value among the estimation errors of the signal strength estimation models that have been estimated based on the positions of other virtual base stations If the estimation error is less than the minimum value, the positioning database generating apparatus stores the estimation error as a minimum value (i.e., updates the minimum value with the estimation error), and stores the signal strengths estimated by the signal strength estimation model in the positioning database as positioning data at step S347.

The positioning database generating apparatus sets the position of the virtual base station again, and repeats the above-described operations S342 to S347 until the positions of all possible virtual base stations are set (see step S348).

Accordingly, the positioning database generating apparatus may store, in a positioning database, the signal strength estimated by the signal strength estimation model (i.e., the most accurate signal strength estimation model) corresponding to the estimation error determined as the minimum value at step S347. As such, the positioning database generating apparatus may determine, as an optimal virtual base station, the virtual base station corresponding to the estimation error determined as the minimum value, and store the signal strength estimated based on the optimal virtual base station in the positioning database. In some embodiments, at step S347, the positioning database generating apparatus may store, as positioning data, the estimated signal strength and position information of the collection area in which the corresponding signal strength is estimated in the positioning database.

Figure 6A:
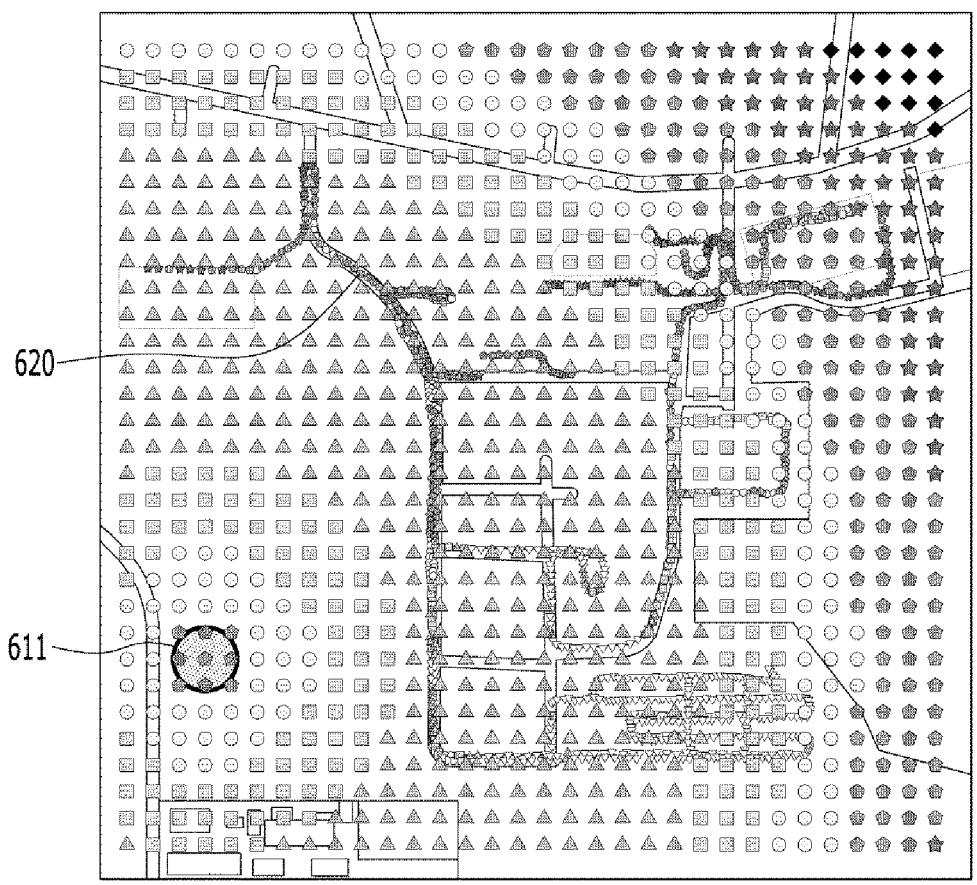
FIG. 6A, FIG. 6B, FIG. 6C, FIG. 6D, FIG. 6E and FIG. 6F are drawings showing examples of positions of virtual base stations and estimated signal strengths in a positioning database generating method according to embodiments.
Figure 6B:
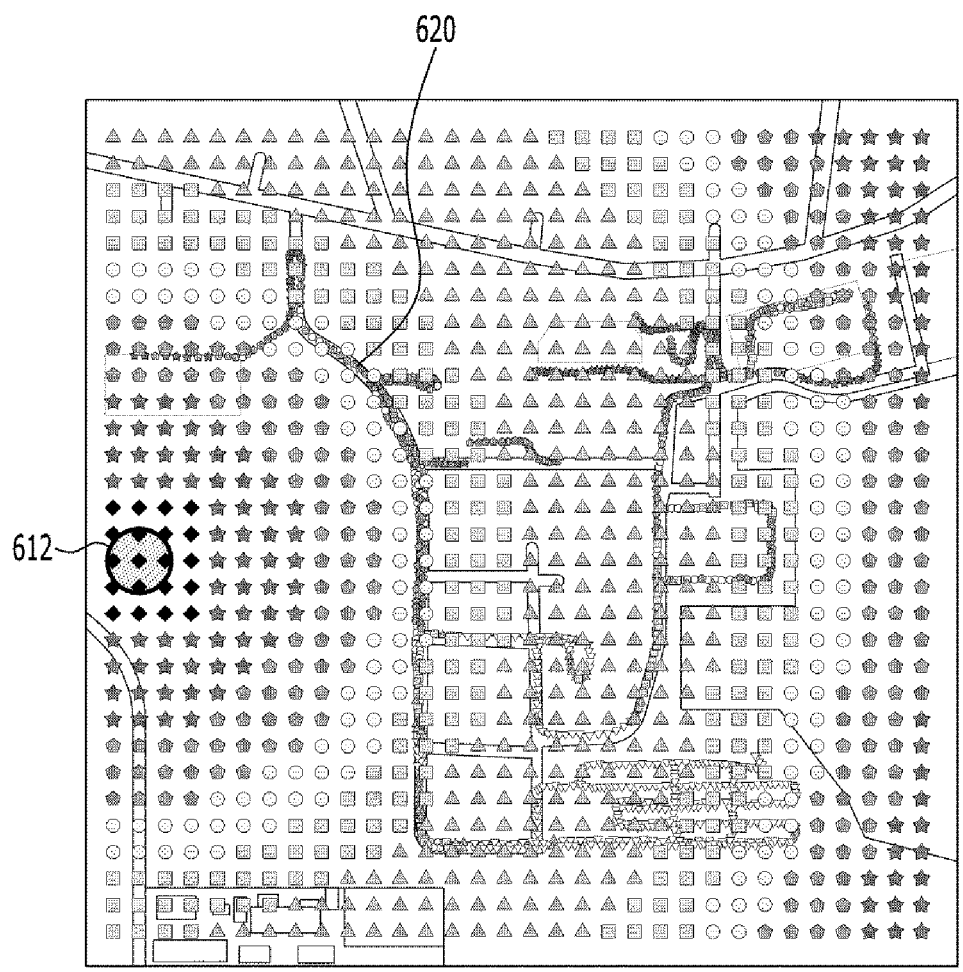
Figure 6C:
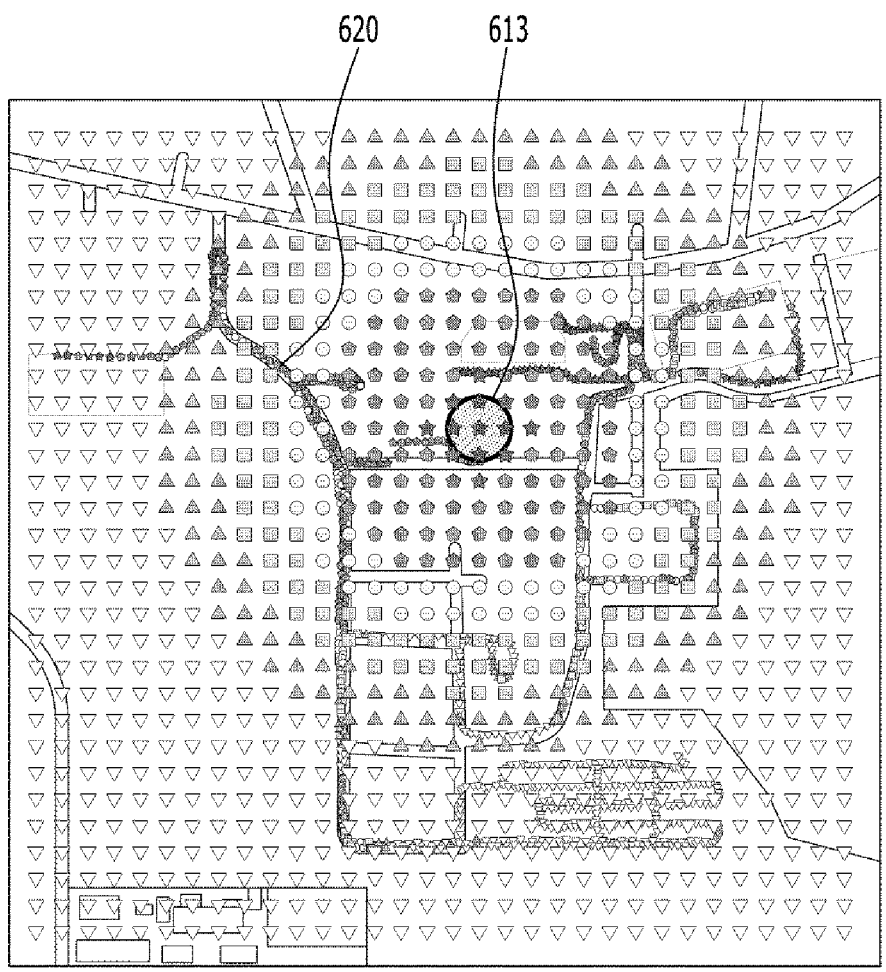
Figure 6D:
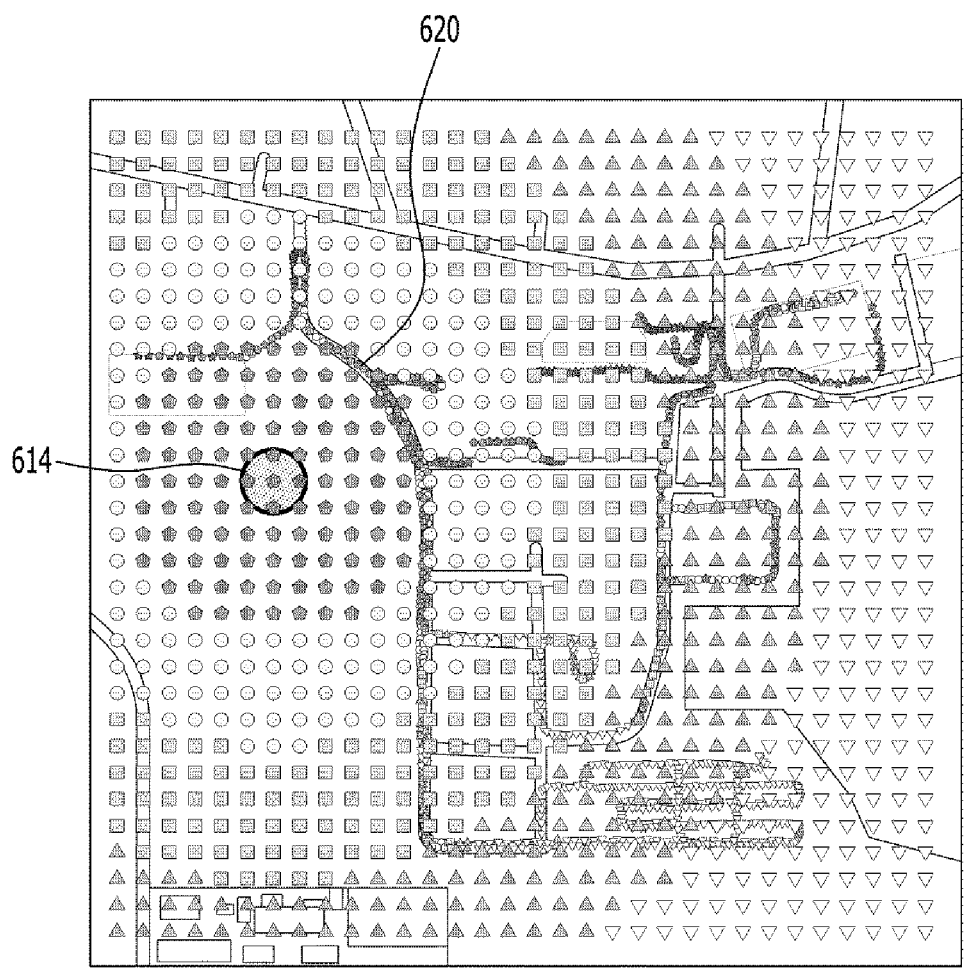
Figure 6E:
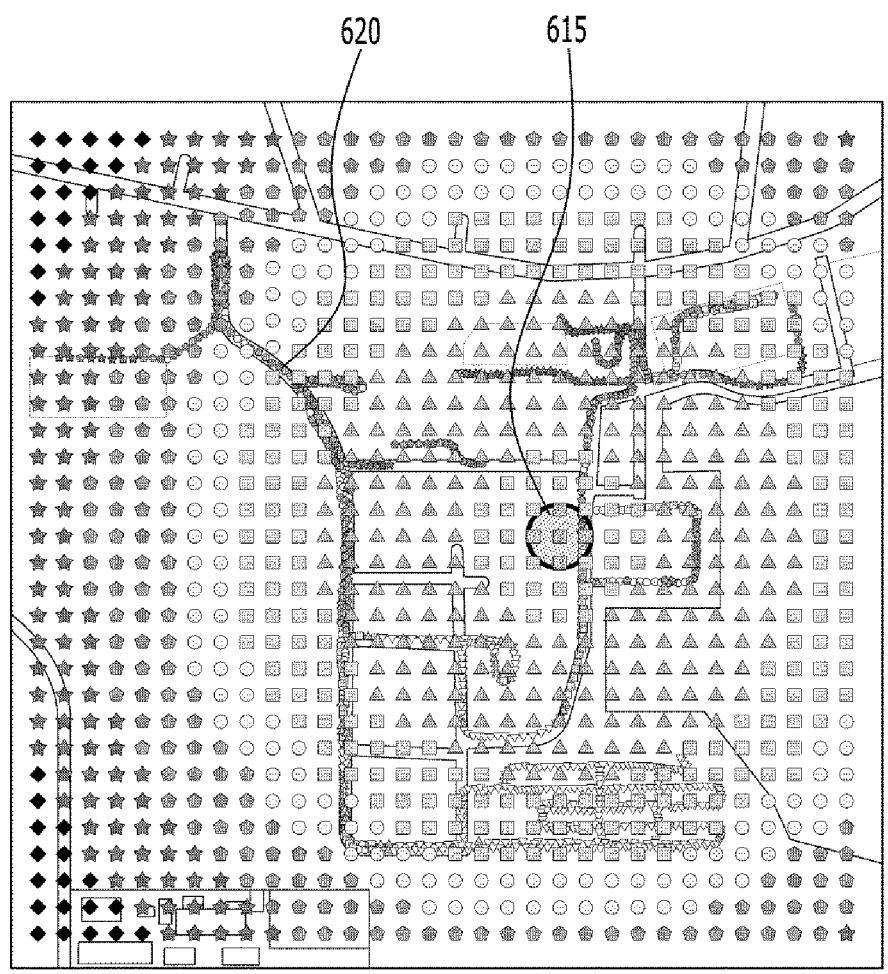
Figure 6F:
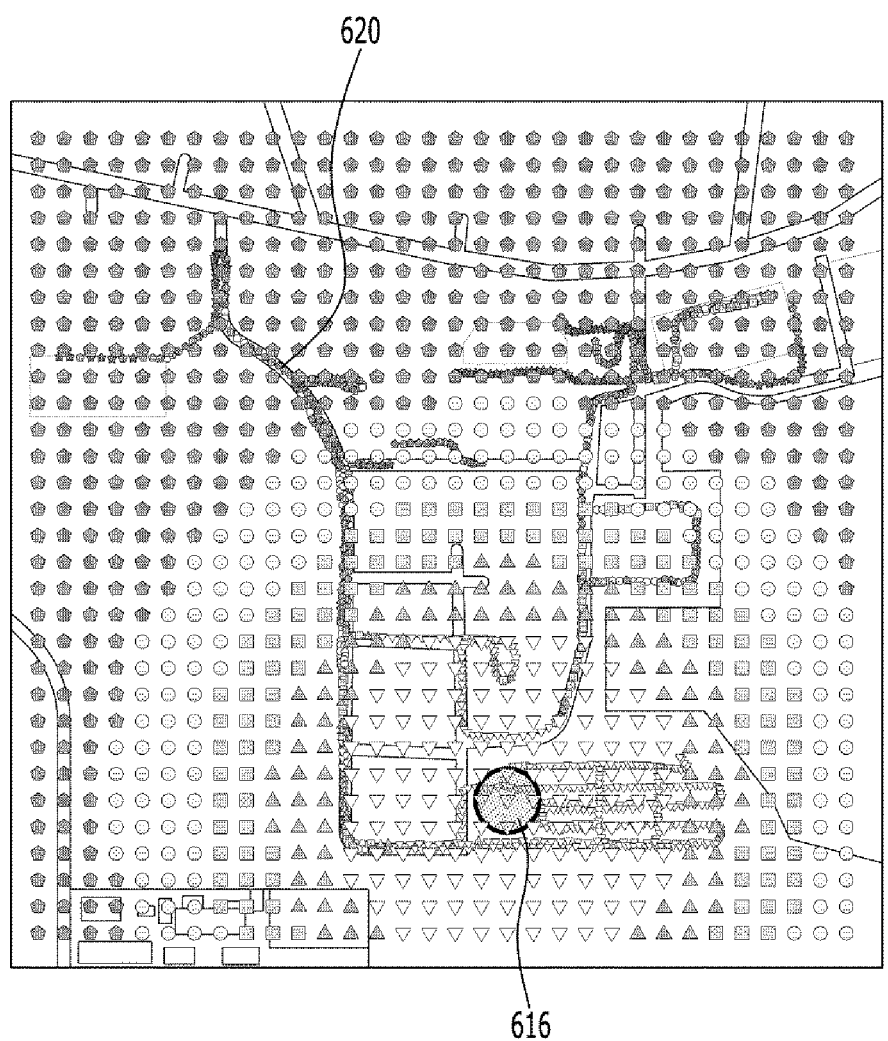

For example, positions 611, 612, 613, 614, 615, and 616 of the virtual base stations may be assumed as shown in FIG. 6A to FIG. 6F. Accordingly, signal strengths estimated based on the positions 611, 612, 613, 614, 615, and 616) of the respective virtual base stations are shown in FIG. 6A to FIG. 6F. In FIG. 6A to FIG. 6F, different signal strengths are shown with symbols of different shapes, and actually collected signal strengths are shown as in an example shown in FIG. 4. In this case, it can be seen that the signal strengths estimated based on the position 616 of the virtual base station shown in FIG. 6F are similar to the actually collected signal strengths 620. Therefore, the positioning database generating apparatus may store, in the positioning database, a signal strength estimated by a signal strength estimation model calculated based on the position 616 of the virtual base station shown in FIG. 6F and position information corresponding to the signal strength.

Referring to FIG. 3 again, the positioning database generating apparatus generates a positioning database of the whole area by storing positioning databases generated by processing collection data of all classifications at step S350.

A position estimation technology using wireless communication signals has been determined as the only alternative in places where a global navigation satellite system cannot be used. However, because a position of a base station transmitting a radio wave is calculated as a position of a terminal until now due to the lack of a technology for constructing strengths of received signals over the whole area at which radio waves can be arrived as a database, the accuracy of position is low. However, according to embodiments described above, it is possible to generate a positioning database for the whole area through an estimation process based on partial collection data, thereby increasing the efficiency of data collection and generating the positioning database even in an area where collection is difficult.

Next, an example computing device for implementing a positioning database generating method or a positioning database generating apparatus according to embodiments is described with reference to FIG. 7.

Figure 7:
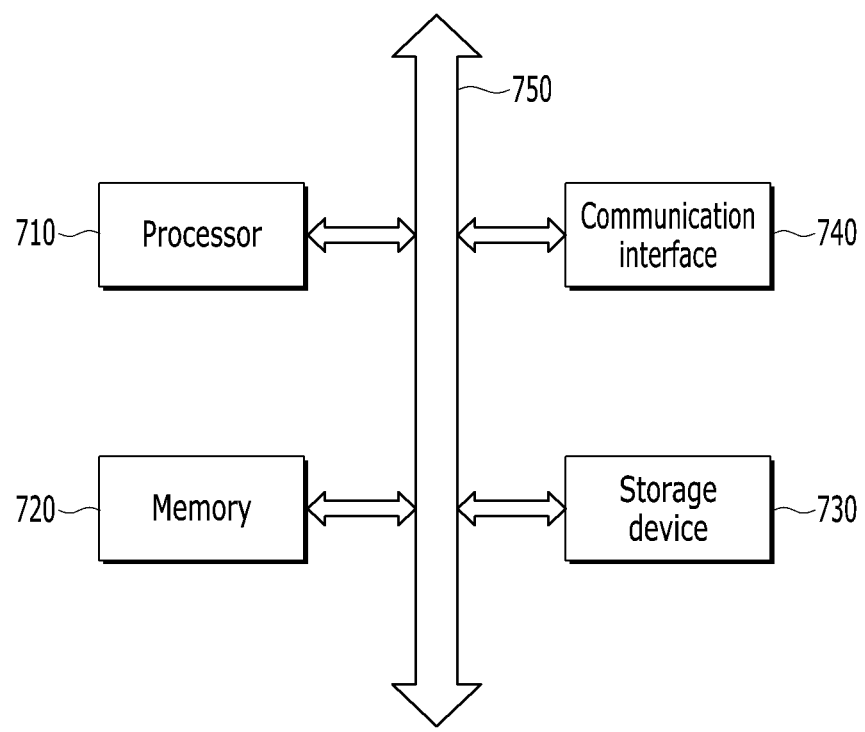
FIG. 7 is a drawing showing an example computing device according to embodiments.

FIG. 7 is a drawing showing an example computing device according to embodiments.

Referring to FIG. 7, a computing device 700 includes a processor 710, a memory 720, a storage device 730, a communication interface 740, and a bus 750. The computing device 700 may further include other general components.

The processor 710 control overall operation of each component of the computing device 700. The processor 710 may be implemented with at least one of various processing units such as a central processing unit (CPU), a microprocessor unit (MPU), a micro controller unit (MCU), and a graphic processing unit (GPU), or may be implemented with parallel processing units. In addition, the processor 710 may perform operations on a program for executing the above-described positioning database generating method.

The memory 720 stores various data, commands, and/or information. The memory 720 may load a computer program from the storage device 730 to execute the above-described positioning database generating method. The storage device 730 may non-temporarily store the program. The storage device 730 may be implemented as a nonvolatile memory. In some embodiments, the storage device 730 may store a positioning database. In some embodiments, the storage device 730 may store collection data.

The communication interface 740 supports wireless communication of the computing device 700.

The bus 750 provides a communication function between components of the computing device 700. The bus 750 may be implemented as various types of buses such as an address bus, a data bus, and a control bus.

The computer program may include instructions that cause the processor 710 to perform the positioning database generating method when loaded into the memory 720. That is, the processor 710 may perform operations for the positioning database generating method by executing the instructions.

In some embodiments, the storage device 730 may store signal strengths of wireless communication signals collected at a plurality of first collection areas among a plurality of collection areas and position information of the first collection areas, The collection areas include the first collection areas and a plurality of second collection areas. In this case, the computer program may include one or more instructions for setting positions of a plurality of virtual transmitting apparatuses, generating a signal strength estimation model in each of the virtual transmitting apparatuses based on a distance between a position of a corresponding virtual transmitting apparatus and each of the first collection areas and a signal strength collected at each of the first collection areas, estimating signal strengths of wireless communication signals in the collection areas based on a distance between the position of each of the virtual transmitting apparatuses and each of the collection areas and the signal strength estimation model in each of the virtual transmitting apparatuses, and generating a positioning database based on signal strengths that are estimated at a position of a virtual transmitting apparatus corresponding to the signal strength estimation model with a highest accuracy of the estimated signal strengths among the virtual transmitting apparatuses.

In some embodiments, the computer program may include one or more instructions for loading signal strengths of wireless communication signals collected at a plurality of first collection areas and position information of the first collection areas, setting positions of a plurality of virtual transmitting apparatuses, estimating signal strengths of wireless communication signals in a plurality of second collection areas based on a distance between a position of each of the virtual transmitting apparatuses and each of the first collection areas, a signal strength collected at each of the first collection areas, and a distance between a position of each of the virtual transmitting apparatuses and each of the second collection areas, determining an optimal virtual transmitting apparatus among the virtual transmitting apparatuses, and generating positioning data at the second collection areas based on signal strengths in the second collection areas which are estimated based on a position of the optimal virtual transmitting apparatus.

In some embodiments, the computer program may include one or more instructions for loading signal strengths of wireless communication signals collected at a plurality of first collection areas and position information of the first collection areas, setting a position of a virtual transmitting apparatus, generating a signal strength estimation model in the virtual transmitting apparatus based on a distance between the position of the virtual transmitting apparatus and each of the first collection areas and a signal strength collected at each of the first collection areas, estimating signal strengths of wireless communication signals in a plurality of second collection areas based on a distance between the position of the virtual transmitting apparatus and each of the second collection areas and the signal strength estimation model, and generating positioning data based on signal strengths estimated at the position of the virtual transmitting apparatus.

The positioning database generating method according to embodiments described above may be implemented as a computer-readable program on a computer-readable medium. In some embodiments, the computer-readable medium may include a removable recording medium or a fixed recording medium. In some embodiments, the computer-readable program recorded on the computer-readable medium may be transmitted to another computing device via a network such as the Internet and installed in another computing device, so that the computer program can be executed by another computing device.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. An apparatus for generating a positioning database, the apparatus comprising:
   a memory for storing one or more instructions;
   a storage device that stores signal strengths of wireless communication signals collected at a plurality of first collection areas among a plurality of collection areas and position information of the plurality of first collection areas, the plurality of collection areas including the plurality of first collection areas and a plurality of second collection areas; and
   a processor including the memory, by executing the one or more instructions:
   sets positions of a plurality of virtual transmitting apparatuses;
   generates a signal strength estimation model in each of the virtual transmitting apparatuses based on a distance between a position of a corresponding virtual transmitting apparatus and each of the plurality of first collection areas and a signal strength collected at each of the plurality of first collection areas;
   estimates signal strengths of wireless communication signals in the plurality of collection areas based on a distance between the position of each of the virtual transmitting apparatuses and each of the plurality of collection areas and the signal strength estimation model in each of the virtual transmitting apparatuses; and
   generates a positioning database based on signal strengths that are estimated at a position of a virtual transmitting apparatus corresponding to the signal strength estimation model with a highest accuracy of the estimated signal strengths among the virtual transmitting apparatuses.

2. The apparatus of claim 1, wherein each of the plurality of first collection areas includes at least one collection point, and wherein the signal strength collected at each of the plurality of first collection areas is a statistical value of a signal strength collected at the at least one collection point.

3. The apparatus of claim 2, wherein the statistical value of the signal strength collected at the at least one collection point includes an average value of the signal strength collected at the at least one collection point.

4. The apparatus of claim 1, wherein the signal strength estimation model includes a path loss model of a signal strength to a distance from the corresponding virtual transmitting apparatus.

5. The apparatus of claim 4, wherein the processor generates the path loss model by performing multinomial regression based on the distance between the position of the corresponding virtual transmitting apparatus and each of the plurality of first collection areas and the signal strength collected at each of the plurality of first collection areas.

6. The apparatus of claim 1, wherein the processor determines the signal strength estimation model with a smallest error between the estimated signal strengths and signal strengths collected at the plurality of first collection areas as the signal strength estimation model with the highest accuracy.

7. The apparatus of claim 1, wherein the processor generates the positioning database based on the signal strengths that are estimated at the position of the virtual transmitting apparatus corresponding to the signal strength estimation model with the highest accuracy, and position information of the plurality of collection areas corresponding to the signal strengths.

8. The apparatus of claim 1, wherein the wireless communication signals collected at the plurality of first collection areas belong to wireless communication signals transmitted from a specific transmitting apparatus.

9. The apparatus of claim 8, wherein the wireless communication signals collected at the plurality of first collection areas belong to a specific band or channel among the wireless communication signals transmitted from the specific transmitting apparatus.

10. The apparatus of claim 9, wherein the processor repeats an operation of generating the positioning database in the specific transmitting apparatus and the specific band or channel over a plurality of transmitting apparatuses and a plurality of bands or channels in each of the transmitting apparatuses.

11. A method of generating a positioning database by a computing device, the method comprising:
loading signal strengths of wireless communication signals collected at a plurality of first collection areas and position information of the plurality of first collection areas;
setting positions of a plurality of virtual transmitting apparatuses via a processor including a memory;
estimating signal strengths of wireless communication signals in a plurality of second collection areas based on a distance between a position of each of the virtual transmitting apparatuses and each of the plurality of first collection areas, a signal strength collected at each of the plurality of first collection areas, and a distance between a position of each of the virtual transmitting apparatuses and each of the plurality of second collection areas;
determining an optimal virtual transmitting apparatus among the virtual transmitting apparatuses; and
generating positioning data at the plurality of second collection areas based on signal strengths in the plurality of second collection areas which are estimated based on a position of the optimal virtual transmitting apparatus.

12. The method of claim 11, wherein the estimating the signal strengths of the wireless communication signals comprises:
generating a signal strength estimation model in each of the virtual transmitting apparatuses based on a distance between a position of a corresponding virtual transmitting apparatus and each of the plurality of first collection areas and a signal strength collected at each of the plurality of first collection areas; and
estimating the signal strengths of the wireless communication signals in the plurality of second collection areas based on a distance between the position of each of the virtual transmitting apparatuses and each of the plurality of second collection areas and the signal strength estimation model in each of the virtual transmitting apparatuses.

13. The method of claim 12, wherein the determining the optimal virtual transmitting apparatus comprises:
estimating signal strengths of wireless communication signals in the plurality of first collection areas based on a distance between the position of each of the virtual transmitting apparatuses and each of the plurality of first collection areas and the signal strength estimation model in each of the virtual transmitting apparatuses; and
determining, as the optimal virtual transmitting apparatus, a virtual transmitting apparatus with a smallest error between the signal strengths estimated in the plurality of first collection areas and the signal strengths collected at the plurality of first collection areas among the virtual transmitting apparatuses.

14. The method of claim 11, wherein the wireless communication signals collected at the plurality of first collection areas belong to wireless communication signals transmitted from a specific transmitting apparatus.

15. The method of claim 14, wherein the wireless communication signals collected at the plurality of first collection areas belong to a specific band or channel among the wireless communication signals transmitted from the specific transmitting apparatus.

16. A method of generating a positioning database by a computing device, the method comprising:
loading signal strengths of wireless communication signals collected at a plurality of first collection areas and position information of the plurality of first collection areas;
setting a position of a virtual transmitting apparatus via a processor including a memory;
generating a signal strength estimation model in the virtual transmitting apparatus based on a distance between the position of the virtual transmitting apparatus and each of the plurality of first collection areas and a signal strength collected at each of the plurality of first collection areas;
estimating signal strengths of wireless communication signals in a plurality of second collection areas based on a distance between the position of the virtual transmitting apparatus and each of the plurality of second collection areas and the signal strength estimation model; and
generating positioning data based on signal strengths estimated at the position of the virtual transmitting apparatus.

17. The method of claim 16, wherein the virtual transmitting apparatus includes a virtual transmitting apparatus with a smallest error between the signal strengths collected at the plurality of first collection areas and the signal strengths estimated in the plurality of first collection areas among a plurality of virtual transmitting apparatuses.

18. The method of claim 17, wherein the wireless communication signals collected at the plurality of first collection areas belong to wireless communication signals transmitted from a specific transmitting apparatus.

19. The method of claim 18, wherein the wireless communication signals collected at the plurality of first collection areas belong to a specific band or channel among the wireless communication signals transmitted from the specific transmitting apparatus.

* * * * *